US006167032A

United States Patent [19]
Allison et al.

[11] Patent Number: 6,167,032
[45] Date of Patent: Dec. 26, 2000

[54] SYSTEM AND METHOD FOR AVOIDING HOST TRANSMIT UNDERRUNS IN A COMMUNICATION NETWORK

[75] Inventors: Samuel Steven Allison, Fuquay-Varina; Kenneth James Barker; Steven Howard Johnson, both of Cary; Joseph Kinman Lee, Raleigh, all of N.C.

[73] Assignee: International Business Machines Corporation, Armonk, N.Y.

[21] Appl. No.: 08/966,278

[22] Filed: Nov. 7, 1997

[51] Int. Cl.[7] ................................. H04J 3/14; H04L 12/28
[52] U.S. Cl. ........................... 370/252; 370/470; 370/419; 370/463
[58] Field of Search .................................... 370/395, 445, 370/421, 420, 419, 463, 470, 471, 410, 252

[56] References Cited

U.S. PATENT DOCUMENTS

| | | | |
|---|---|---|---|
| 4,051,355 | 9/1977 | Lin ........................................ | 235/302.3 |
| 4,942,553 | 7/1990 | Dalrymple et al. ...................... | 364/900 |
| 4,945,548 | 7/1990 | Iannarone et al. ........................... | 374/4 |
| 5,299,313 | 3/1994 | Petersen et al. .......................... | 395/200 |
| 5,319,752 | 6/1994 | Petersen et al. .......................... | 395/250 |
| 5,434,872 | 7/1995 | Petersen et al. ........................ | 371/87.1 |
| 5,485,584 | 1/1996 | Hausman et al. ........................ | 395/842 |
| 5,548,587 | 8/1996 | Bailey et al. ........................... | 370/60.1 |
| 5,561,666 | 10/1996 | Christensen et al. ...................... | 370/24 |
| 5,594,702 | 1/1997 | Wakeman et al. .................. | 365/230.05 |
| 5,602,537 | 2/1997 | Dalrymple ......................... | 340/825.06 |
| 5,623,606 | 4/1997 | Yokoyama et al. ...................... | 395/250 |
| 5,623,700 | 4/1997 | Parks et al. ............................. | 395/873 |
| 5,721,841 | 2/1998 | Szczepanek et al. .................... | 395/310 |
| 5,732,094 | 3/1998 | Petersen et al. ........................ | 371/51.1 |
| 5,784,573 | 7/1998 | Szczepanek et al. .................... | 395/200 |
| 5,832,238 | 11/1998 | Helms ..................................... | 395/285 |
| 5,850,557 | 12/1998 | McTague et al. ........................ | 395/735 |
| 5,864,653 | 1/1999 | Tavallaei et al. ........................ | 315/181 |

OTHER PUBLICATIONS

IBM Technical Disclosure Bulletin, vol. 33, No. 12, May 1991, pp. 370–371, "Efficient Dual–Port First–In, First–Out Buffer with an Overrun and Underrun Detection Scheme".

IBM Technical Disclosure Bulletin, vol. 37, No. 11, Nov. 1994, pp. 457–458, "Adaptive Prediction Minimizes Data overrun and Underrun".

*Primary Examiner*—Min Jung
*Assistant Examiner*—Enrique L. Santiago
*Attorney, Agent, or Firm*—Joseph C. Redmond, Jr.; J. G. Cockburn

[57] ABSTRACT

A system and method to avoid transmit underruns from a host system to a communication network using an adjustable threshold on a frame basis. The host system includes a device driver, host descriptors and host buffer. The host descriptor define the number of blocks of data to be transferred from the host to the network via a Media Access Control (MAC) device. The MAC device includes a processor, a transmit storage device, and a medium independent interface coupled to the network. The MAC device is connected to the host system via a data bus. A host descriptor is generated for each frame of data transferred by the MAC device from the host to the network. The descriptor is generated by the device driver and provides the MAC processor with a block size of data to be transferred and a threshold in each frame indicating the number of blocks of data to be transferred from the host system to the MAC device to avoid an underrun before transmission to the communication network. The MAC processor generates and transmits a "retry" bit to the device driver when a transmit underrun occurs. The device driver modifies the threshold in subsequent frames to avoid transmit underruns by raising or lowering the thresholds according to the number of retries.

14 Claims, 9 Drawing Sheets

Table 15 Transmit Frame Descriptor Status

Figure 3a

| Bit | Bit Name | Bit Description |
|---|---|---|
| 31:28 | Reserved | |
| 27:14 | Reserved | |
| 13 | Transmit with Retry | Set to 1 by PaceTx if a Transmit Underrun occurred while transmitting a frame. PaceTx will automatically retransmit the frame in this case. All frame data has been successfully transferred from host memory to the Tx FIFO if bit 12 is set to 1. |
| 12 | Frame Processed | Set to 1 by PaceTx after a frame has been processed by PaceTx. This bit is set without regard to any errors during transmission. This bit indicates to the host software that the rest of the Status bits are valid. |
| 11:8 | Number of Collisions | This 4-bit field contains the number of collisions detected while attempting to transmit the frame. This field is set by Pace Tx and can be used by the device driver. |
| 7 | Late Collision | Set to 1 by PaceTx when it detects a Late Collision on the media. |
| 6 | Excessive Collisions | Set to 1 by PaceTx after attempting to transmit the current frame 16 times and each time resulted in a collision. |
| 5 | Excessive Deferrals | Set to 1 by PaceTx to indicate that the current frame was not able to be transmitted until a time-out of the excessive deferral timer (2.46ms). |
| 4 | CRC Error | Set to 1 by PaceTx if the transmitted frame includes a CRC that is incorrect. This bit is only set if Bit 30 of the Mode register is set to 0. |
| 3 | CRS | Set to 1 by PaceTx to indicate a loss of the carrier sense. During a Half- Duplex or Full-Duplex operation PaceTx expects CRS to be asserted from the end of the frame preamble until the end of the frame transmission. A loss of Carrier Sense can indicate a PHY layer error or medium error. |
| 2 | Long Frame | Set to 1 by PaceTx when a frame greater than 1518 bytes has been transmitted. |
| 1 | Reserved | |
| 0 | FIFO Underrun | Set to 1 by PaceTx when its internal FIFO cannot provide data to the MII at a rate required to maintain transmission. |

Table 16 Transmit Frame Descriptor Parameters    Figure 3b

| Bit | Bit Name | Bit Description |
| --- | --- | --- |
| 31:29 | Reserved | |
| 28 | Transmit Queued | The device driver must set this bit to 1 when it has queued the descriptor for transmission. If PaceTx processes a descriptor with this bit set to 0, it indicates a chaining error (Bit 17 or Bit 16 of the SISR). PaceTx will set this bit to 0 after posting status. |
| 27:8 | Reserved | |
| 7:0 | Tx Threshold | This field indicates the number of Tx blocks of data that PaceTx is to transfer from host memory to the Tx FIFO before initiating Transmission on the media. |

SYSTEM AND METHOD FOR AVOIDING HOST TRANSMIT UNDERRUNS IN A COMMUNICATION NETWORK

RELATED APPLICATION

Copending application entitled "A System And Method For Automatic Retry Of A Transmit, Independent Of A Host Processor After An Underrun Occurs In A LAN", Ser. No. 08/982,726, filed Dec. 2, 1997, (RA9-97-062), and assigned to the same assignee as that of the present invention.

BACKGROUND OF THE INVENTION

1. Field of the Invention

This invention relates to communication networks, e.g., LANS. More particularly, the invention relates to a system and method for avoiding host transmit underruns using a frame adjustable threshold in a communication network.

2. Description of Prior Art

In a communication network in which a host system exchanges data with the network through a Peripheral Component Interconnect (PCI) bus and a Medium Access Control (MAC) device, a significant problem is presented when transmit underruns occur requiring the host system to retransmit a sequence of frames. Due to the poor performance of the PCI bus in some computers, MAC devices may have difficulty moving data from a host buffer to a transmit storage device, e.g., RAM, fast enough to keep data flowing to the network. Often delay states are introduced in this transfer by the PCI bus, adding time to the transfer. The additional data transfer time across the PCI Bus causes the data to be read out of the transmit storage device faster on the network side than data is provided to the input side of the transmit storage device. If the data being written into the transmit storage device is at a slower rate than transmitted to the network, a transmit underrun can occur.

Because of the possibility of transmit underruns, one technique is to preload data into the transmit storage device before beginning transmission on the network. A problem is presented in determining how much data to preload to the transmit storage device. If too much data is preloaded than is needed to prevent an underrun, the network performance will be degraded. If not enough data is preloaded, transmit underruns will occur. A solution to the problem is to determine the correct amount of data to preload on transmission. The amount of data to be loaded can vary from system-to-system depending on the PCI bus performance. The amount of data that is preloaded in the transmit storage device is referred to as a "transmit threshold".

The primary objective in frame transmission is to transmit each frame as soon as possible, by keeping the transmit threshold as low as possible. However, if the threshold is too low, the system may not be able to keep up with the demand for data to be transmitted, thereby incurring an underrun which must be retried with a higher threshold. For performance reason, underruns should be avoided by incurring a slightly higher frame latency rather than initiate a retry on a large number of frames.

Prior art related to transmit underruns in a communications system include the following:

U.S. Pat. No. 5,602,537 issued Feb. 11, 1997, filed May 13, 1994, discloses a technique for eliminating data transfer memory underruns. Once the amount of preloading in a FIFO reaches a predetermined threshold value or the end of frame data has been preloaded, a transmitter begins transmitting data from the memory.

U.S. Pat. No. 5,434,872 issued Jul. 18, 1995, discloses a dedicated transmit buffer with monitoring of the data in the frame to prevent underrun. The amount of data of a frame downloaded by the host to the transmit buffer is monitored to make a threshold determination of an amount of data of the frame resident in the transmit data buffer. A network interface controller includes logic for initiating transmission of the frame when a threshold determination indicates that a sufficient portion of the frame is resident in the transmit buffer, prior to the transfer of all of the data of the frame into the transmit buffer. The monitoring logic includes a threshold state which is programmable by the host computer for storing a threshold value. The threshold value may be set by the host system to optimize performance in a given setting.

U.S. Pat. No. 5,623,606 issued Apr. 22, 1997, filed Oct. 29, 1992, discloses a threshold amount of preloading that is set in a MAC device by host software. The MAC device has logic to determine if the threshold is met before starting transmission.

U.S. Pat. No. 4,942,553 issued Jul. 17, 1990, discloses detecting a fill or empty level of a FIFO. When a fill or empty level exceeds a first request level, notification is made to a Direct Memory Access (DMA) or a coprocessor. The fill or empty level is compared to a second request level, and when such level exceeds a second level request, second level notification to the CPU is generated. In most cases, DMA or coprocessor is able to obtain control of the bus before the request level for a CPU interrupt is reached thereby preventing a waste of CPU intervention as well as FIFO overrun/underrun.

U.S. Pat. No. 4,945,548 issued Jul. 31, 1990, discloses detecting impending overflow and/or underruns of an elasticity buffer. Write overflow or read underrun of a storage element is detected before any data corruption can occur by comparing input and output pointers. An error condition is detected if the input and output pointers overlap for a threshold, which can be shorter than a period required for writing or reading of a multi-bit data unit to or from the buffer. The overlap time period is determined by comparing the pointers at one or more sampling times corresponding to selected phases of a clock.

IBM Technical Disclosure Bulletin (TDB) published May 1991, pages 370–371, discloses a technique for detecting overrun and underrun conditions in a queue communications network while guaranteeing the data integrity of a First-In or First-Out (FIFO) buffer.

None of the prior art establishes an adjustable transmit threshold for a MAC device on a frame-by-frame basis using blocks of data instead of a byte count and providing a "retry" signal to a host system to readjust the transmit threshold according to the host system's performance level.

SUMMARY OF THE INVENTION

An object of the invention is an improved system and method for avoiding host system transmit underruns in a communication network.

Another object is an improved system and method for avoiding host system transmit underruns via a frame-based threshold in a communication network.

Another object is a system and method for optimizing a frame threshold for preloading data into an adapter to avoid transmit underruns in a communication network.

Another object is an improved interface and method of operation in a communication network for avoiding a host system transmit underrun via a host system descriptor using an adjustable frame-based threshold.

Another object is an improved Media Access Control (MAC) device and method providing a retry signal to a host system for re-adjusting a frame-based threshold to avoid transmit underruns to a network.

These and other objects, features and advantages are achieved in a communication network, e.g. a LAN including a host system coupled to the network through a peripheral component interconnect (PCI) bus, a medium access control (MAC) device, and a medium independent interface. The host system includes host software, device driver, host descriptors, and a host buffer for exchanging data with the network via the MAC device. The MAC device includes a PCI interface, processor and storage buffer, e.g., RAM, in which host data is moved by the processor in blocks from the host buffer to the MAC storage device. The block size is determined by the host driver and provided to the processor. Each frame has a descriptor which contains a field defining a threshold indicating the number of data blocks to transfer from the host system before transmission to the network. The threshold is specified for each frame by the device driver. When an underrun occurs in the storage device, the processor provides a "retry" status bit to the host descriptor. The device driver uses the "retry" bit to re-determine the transmit threshold for each frame to avoid underruns. The device driver uses an algorithm to monitor internal counters and determine the optimum threshold for frame transmissions to avoid underruns. Using the algorithm, the transmit threshold is raised or lowered to minimize the number of underruns and maximize the network's performance. The threshold is relayed to the MAC processor on a frame-by-frame basis and determines the number of blocks to transfer from the host buffer before starting transmission to the network.

DESCRIPTION OF THE DRAWINGS

The invention will be further understood from a detailed description of a preferred embodiment, taken in conjunction with an appended drawing, in which:

FIG. 3 (including FIG. 3a and FIG. 3b) is a table of a transmit frame descriptor parameter/status field describing bit number, bit name and bit description.

DESCRIPTION OF PREFERRED EMBODIMENT

Figure 1:
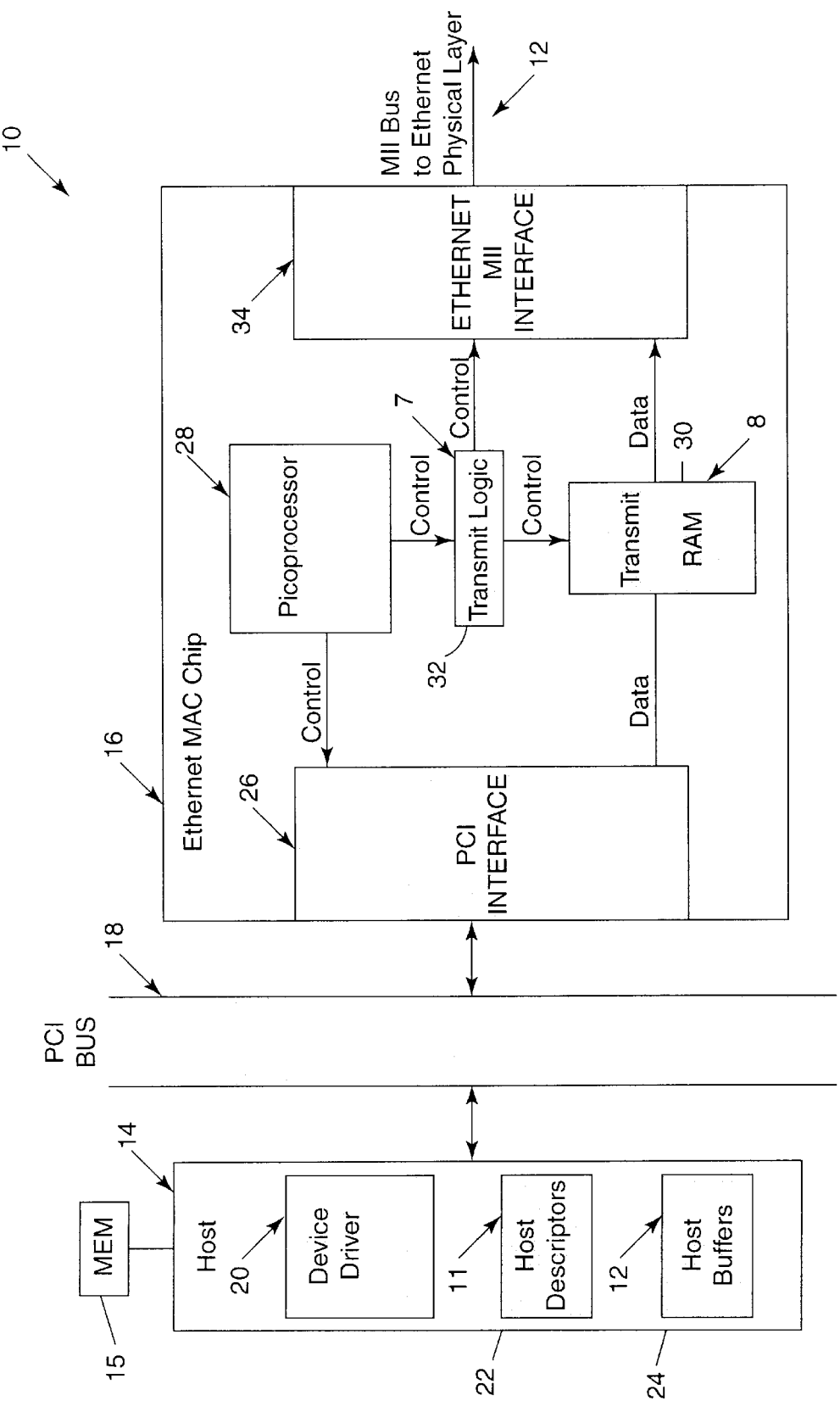
FIG. 1 is a block diagram of a host system for exchanging data with a communication network via a Peripheral Component Interconnect (PCI) bus, a Media Access Control (MAC) device, a medium independent interface and incorporating the principles of the present invention.

In FIG. 1, a Local Area Network (LAN) 10, for example, an Ethernet, token ring or the like includes a physical layer 12 coupled to a host system 14 through a Media Access Control (MAC) device 16 and a Peripheral Component Interconnect (PCI) bus 18. Blocks of data frames are exchanged between the host system and the network 10 using conventional protocols, described for example in, a text "Ethernet—Building A Communication Infrastructure" by H. Hegering et al, published by Addison-Wesley, Reading, Mass., 1994 (ISBN:0-201-62405-2) or "IBM's Token Ring Handbook" by G. C. Sackett, published by McGraw-Hill, Inc., New York, N.Y., 1993, or "Computer Networks" by Andrew S. Tannenbaum, published by Prentice-Hall, Englewood Cliffs, N.J., 1989.

The host 14 includes a device driver 20 in the form of software which serves as a link between the network operating system and the MAC device. The device driver presents the operating system with a set of functions which the host system can call upon the device driver to perform. The device driver translates these functions into specific sets of instructions which the MAC device uses to operate in transferring blocks of data in a sequence of frames from a host buffer 24 to the MAC device. The host system also includes host descriptors 22 for each frame of data as it is transferred from a host memory 15 to the network 10 via host buffers 24.

Figure 2:
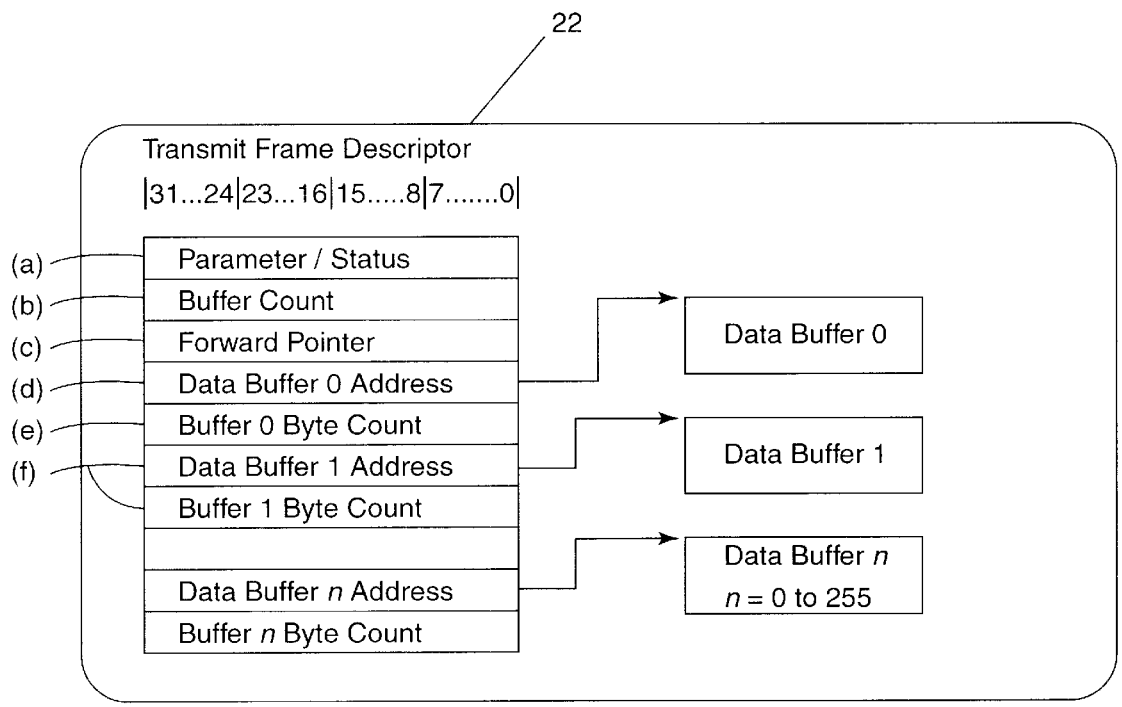
FIG. 2 is a block diagram of a threshold descriptor used in the system of FIG. 1 in transferring data from the host system to the MAC device.

In FIG. 2 a 32 bit wide transmit frame descriptor 22' is shown for each frame transmitted to the network. The transmit frame descriptor links multiple data buffers together in the host memory 15, the contents which form the frame. The number, length, and host memory locations of each of these buffers is contained in the transmit frame descriptor 22' which contains the following fields:

A parameter/status field 22(a) contains the MAC frame status after the frame has been transferred from host memory to the MAC device. The status contents of this field are provided by the MAC device and used by the device driver software to determine the status of the transmitted frame. The parameter contents of the field are set by the device driver to indicate information to the MAC on how the data movement should be handled.

A buffer count field 22(b) contains the number of data buffers used to contain the frame being transmitted. This field is set by the device driver before transmission starts and can contain any value from 1 to 255.

A forward pointer field 22(c) contains the host memory address of the next transmit frame descriptor queued for transmission. This field is set by the device driver and is used by the MAC. Using this pointer, the next frame queued for transmission can be located in the host memory.

A data buffer address field 22(d) contains the host memory starting address of the data buffer that contains all or part of a frame to be transmitted. This field is set by the device driver and is used by the MAC device for locating the frame content. Each buffer associated with the descriptor has a data buffer address field and a buffer byte count field located in the descriptor.

A buffer byte count field 22(e) contains the number of bytes in the associated buffer that are to be transferred from the buffer by the MAC. This field is set by the device driver and used by the MAC. Each buffer associated with the descriptor has a data buffer address field and a buffer byte count field located in the descriptor.

A data buffer address and byte count field 22(f) contains other frame or partial frames to be transmitted. The buffer structure is built by the host software and is used by the MAC device as the source of the data to be transmitted.

FIG. 3 reflects the transmit frame descriptor status at the time the frame has been moved from the host into the MAC and not after the frame has been transmitted to the medium or network. In FIG. 3, bit 13 is used by the MAC device as a "retry bit" to report a transmit underrun to the device driver when the MAC device cannot provide data to the network at a rate required to maintain the transmission rate. A frame transmit threshold field is generated by the device driver in the last 8-bits of the parameter/status field.

Returning to FIG. 1, the MAC device is coupled to the bus 18 by means of an interface 26 under the control of a processor 28 for transferring data from the host buffer 24 to a transmit storage device, e.g. RAM 30. Data is moved in logical blocks. Block size is a parameter set by the device driver, as is the frame threshold field of the host descriptor. The threshold field is specified for each frame. Data is transferred from the RAM 30 to a medium independent interface 34 under the control of a transmit logic for output to the network 10. The unit 32 is further described in a copending application, Ser. No. 08/982,726, filed Dec. 2, 1997, entitled "A System and Method for Automatic Retry of a Transmit, Independent of a Host Processor, After an Underrun Occurs in a LAN" (RA9-97-062) assigned to the same assignee as that of the present invention and fully incorporated herein by reference.

More specifically, the transmitted frame from the host to the network, the descriptors and data buffers associated with that frame are built up by the device driver in the host memory. The frame may require more than one host buffer. The number of buffers required depends on the length of the frame and the number of bytes placed in each buffer. Information regarding the number of buffers, including those with zero data bytes, the starting host memory address of each buffer, and the number of bytes in each buffer are contained in the frame descriptor. The order in which the buffers are transmitted is implied by the descriptor.

The transmit block threshold which is the last 8-bits of the parameter/status field is set by the host software to indicate to the processor 28 how many blocks of transmit frame data to transfer to the transmit RAM 30 before initiating a transmit. This field is initialized to a non-zero value by the host software. Data is transferred by the processor 28 in the following manner: The first block transferred is the same size as the transmit block size set in the block-sized register. Subsequent blocks are transferred using a block size determined by the device driver. The block size is conveyed to the processor 28 via write register (not shown). The processor 28 will initiate transmission of a frame once the number of blocks indicated in the transmit threshold field has been transferred from host memory to the transmit RAM 30. If the transmit RAM underrun occurs, the processor will retransmit the frame by transferring the frame data again from host memory to the transmit RAM, but transmission will not begin until the transmit threshold plus one block has been transferred.

After each frame is transferred from host memory to the transmit RAM, the transmit descriptor parameters/status field is updated by the processor 28. If an underrun occurs, the processor 28 indicates this to the device driver 20 via the "retry" status bit in the host descriptor. This bit indicates that an underrun occurred and a "retry" was necessary. The device driver uses the "retry" bit to determine the value to which the transmit threshold should be set in the host descriptor. The device driver maintains internal counters to determine the optimum threshold, as will now be described in FIG. 4 taken in conjunction with FIG. 5.

Figure 1A:
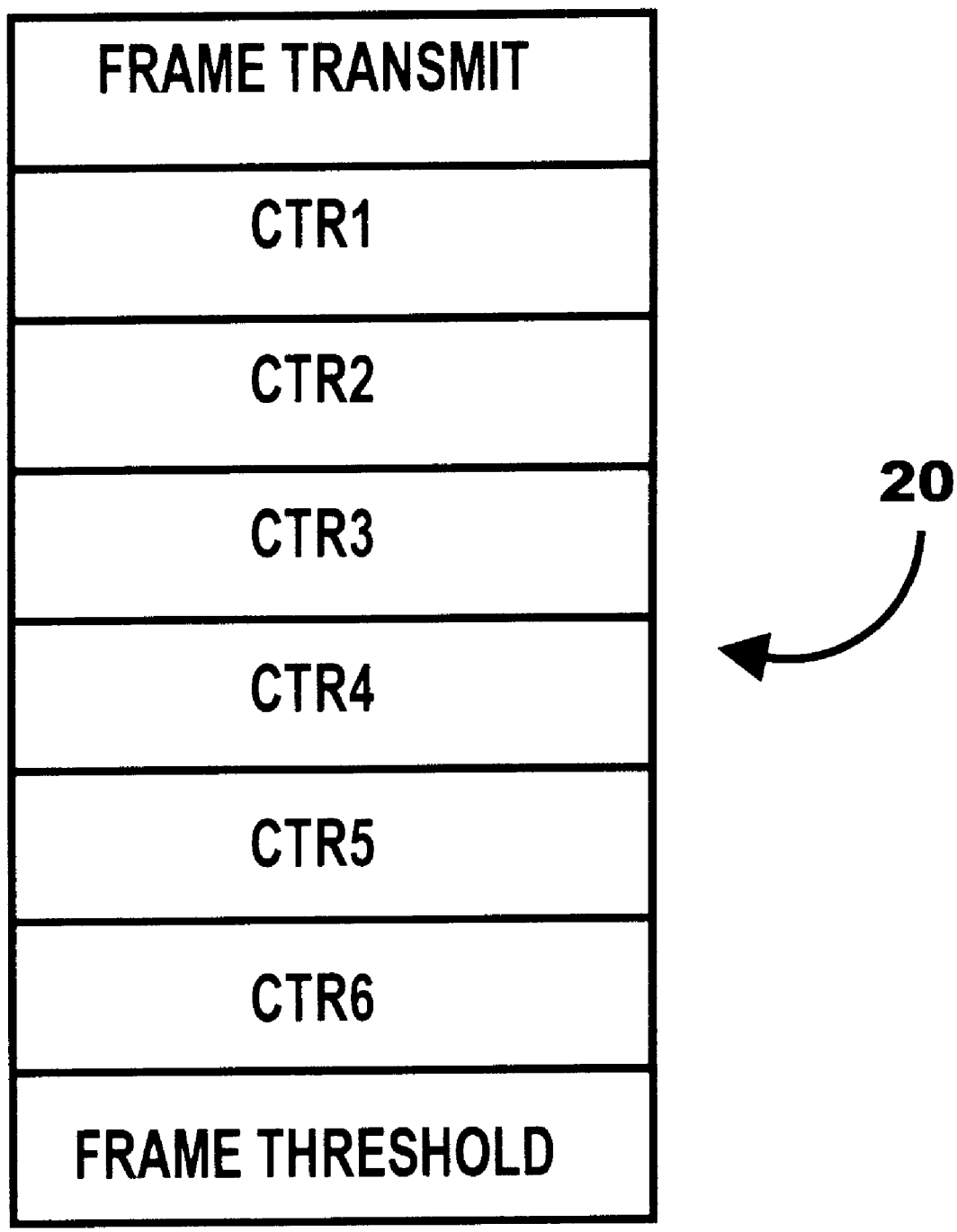
FIG. 1A is a representation of a device driver in the host of FIG. 1 and include counters for use in the flow diagram of FIG. 4.
Figure 4A:
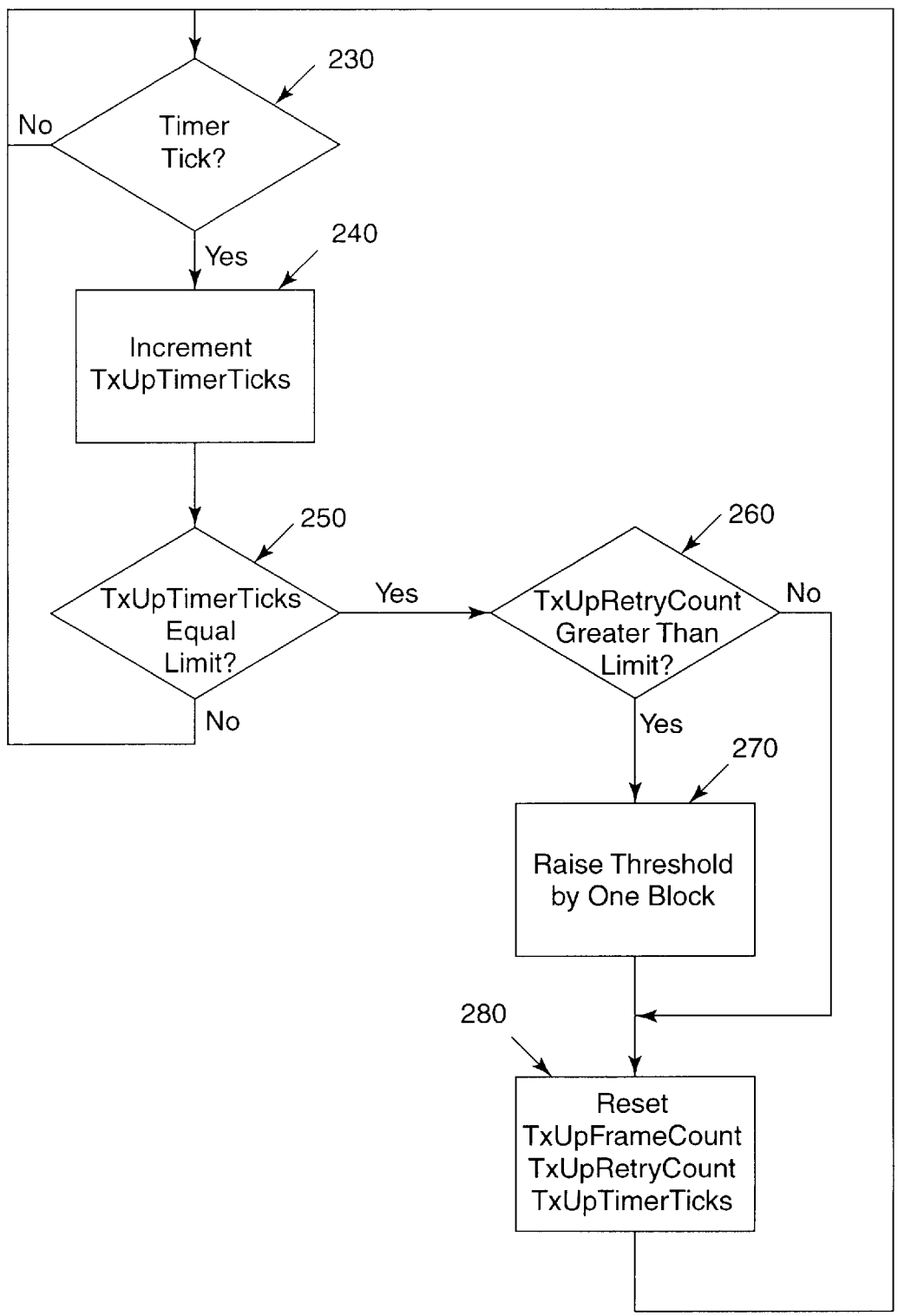
FIG. 4 (including FIG. 4a, FIG. 4b and FIG. 4c) is a flow diagram for adjusting a frame threshold in the descriptor of FIG. 2 to avoid a transmit underrun in the system of FIG. 1.
Figure 4B:
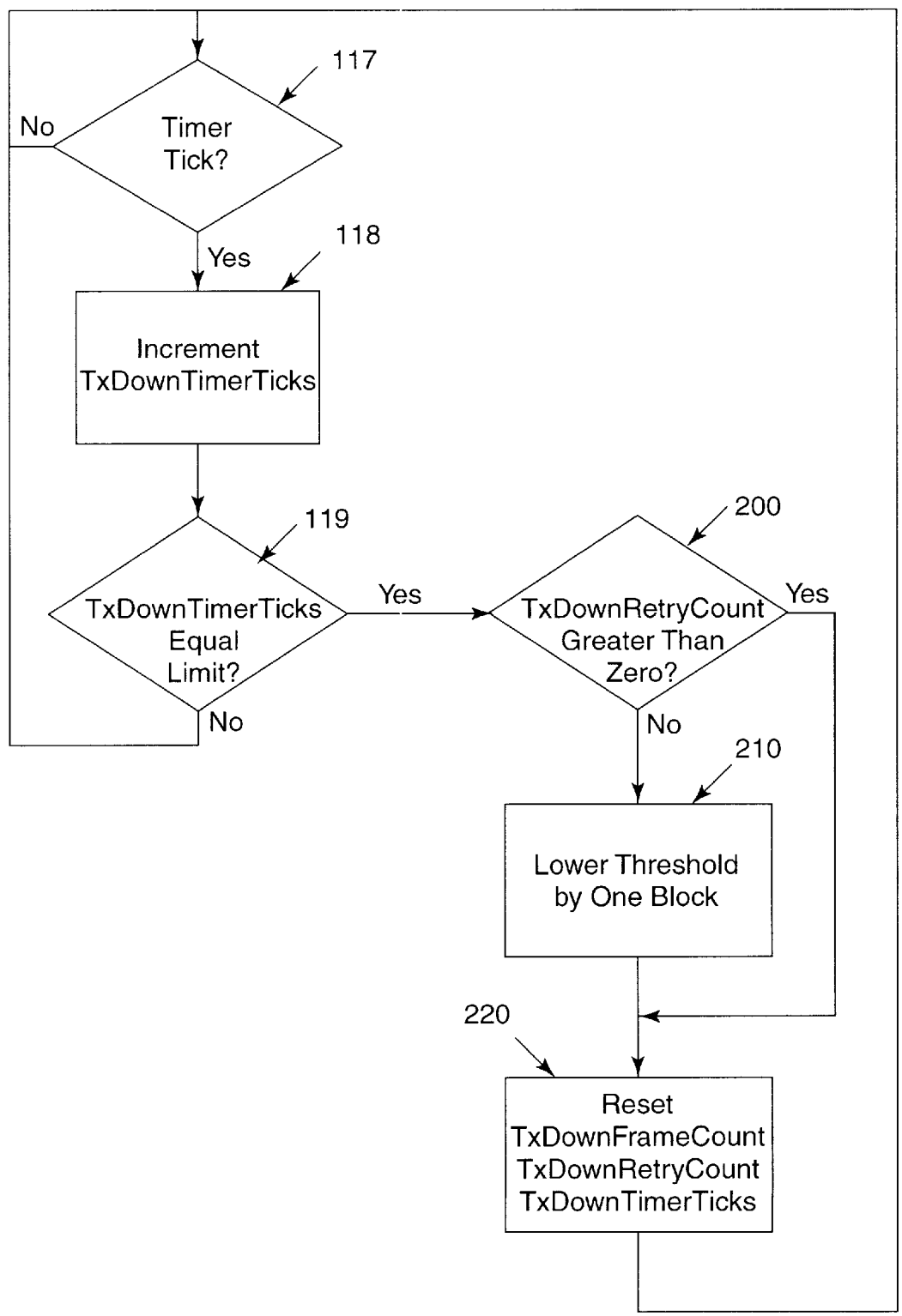
Figure 4C:
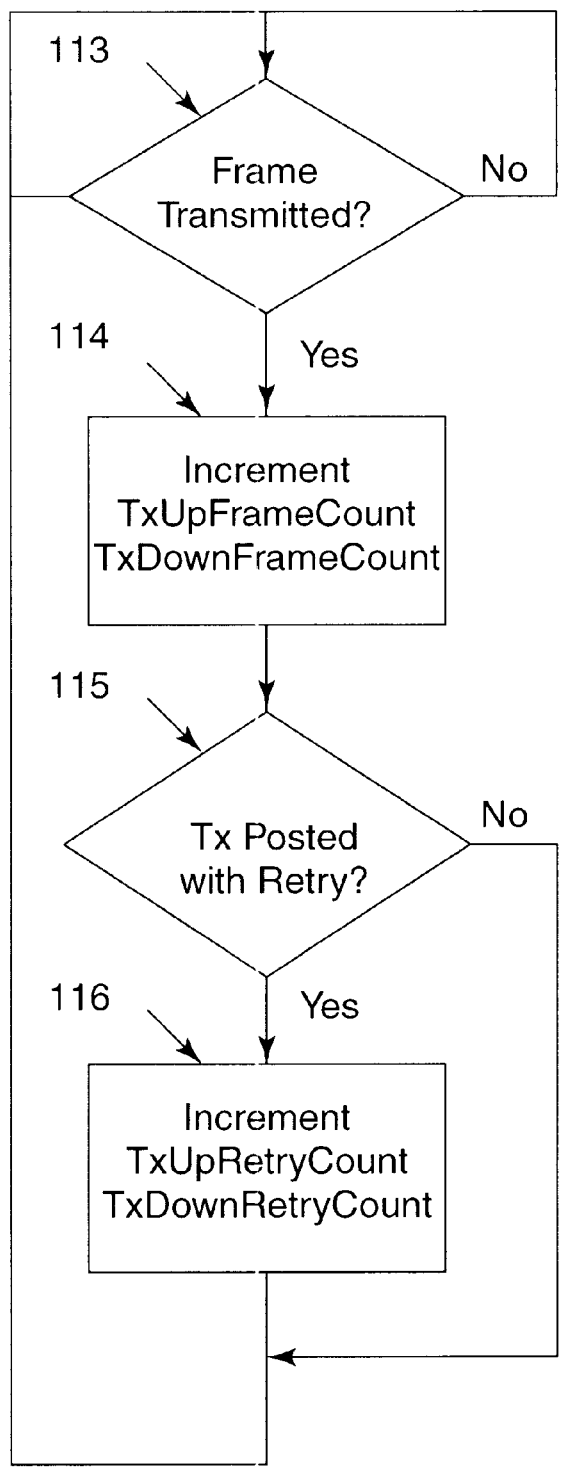

In FIG. 4, counters are incremented with each timer tick from a timer (not shown) associated with the device driver. The counters shown in FIG. 1A, are maintained over two time intervals: One for determining whether the threshold should be raised, and the other for determining whether the threshold should be lowered.

Figure 5:
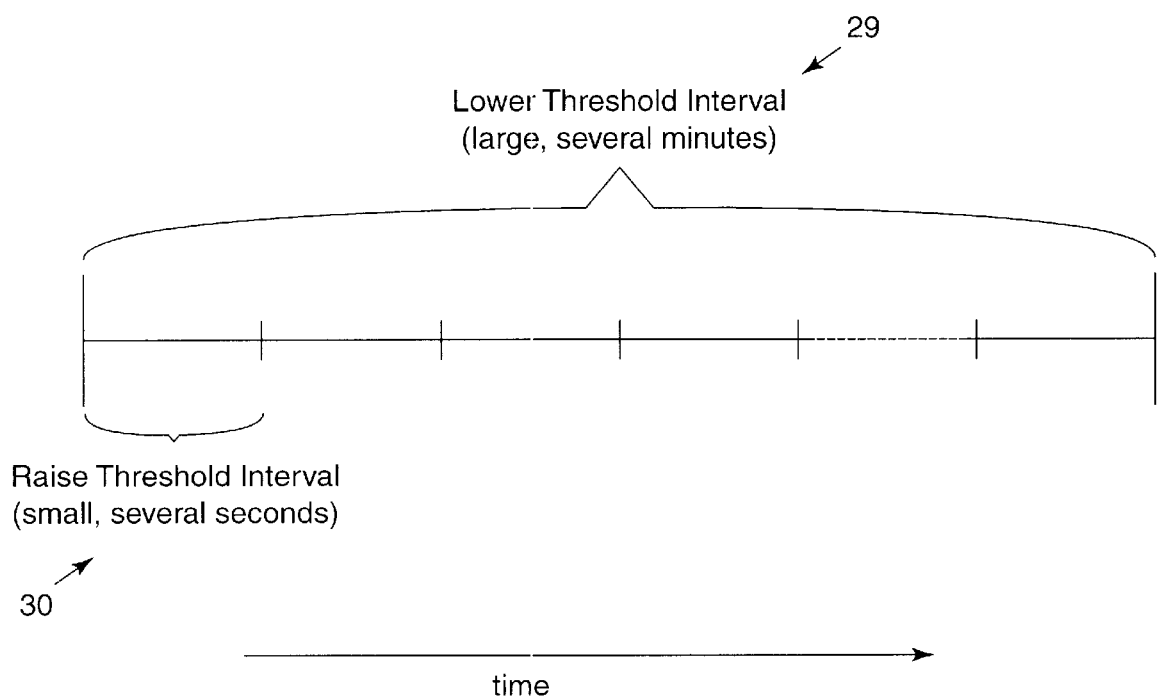
FIG. 5 is a timing diagram for determining the interval for adjusting the threshold according to the method shown in FIG. 4.

The timing intervals are shown in FIG. 5 along a time axis in which the timer ticks are indicated for lowering or raising the threshold. The interval or timer ticks for lowering the threshold is long while the interval for raising the threshold is short. The raise interval is a sub-interval of the lower threshold interval. The intervals are monitored by the counters checking for timer ticks. The counters used in the threshold determining process are as follows:

(1) TXUpFrameCount—Frames transmitted in the "raise threshold" interval.

(2) TXUpRetryCount—Frames retried in the "raise threshold" interval.

(3) TXUpTimerTicks—Time spent in the "current raise threshold" interval.

(4) TXDownFrameCount—Frames transmitted in the "lower threshold" interval.

(5) TXDownRetryCount—Frames retried in the "lower threshold" interval.

(6) TXDownTimerTicks—Time spent in the "current lower threshold" interval.

Returning to FIG. 4, the frame threshold is adjusted on a frame-by-frame basis in accordance with the following process:

The process is entered in a step 113 in which the transmit status is tested to determine if a frame has been transmitted. A "no" condition returns the process to the initial condition. A "yes" condition initiates a step 114 to increment counter (1) TxUpFrameCount and counter (4) TXDownFrameCount.

In a step 116, the transmit status is tested to determine whether the frame transmission has been posted with a "retry" or "underrun" condition. A "no" condition returns the process to the "start" state. A "yes" condition increments the counter (2) TxUpRetryCount and the counter (4) TxDownRetryCount in a step 116.

In a step 117, the time ticks are checked and the counter (6) TxDownTimerTicks is incremented in a step 118, after which the counter (6) is compared to a timer tick limit set for the lower threshold interval. A "no" condition returns the process to checking timer ticks in step 117. A "yes" condition initiates a test 200 to determine if the counter (5) TxDownRetryCount is greater than zero. A "no" condition initiates a step 210 to lower the threshold by one block. A "yes" condition for the test 200 advances the process to the step 220 in which the counters (4), (5) and (6) are reset in a step 220, after which the process returns to step 117 in checking the timer ticks.

In a step 230, the timer ticks are used to increment the counter (3) TxUpTimerTicks in a step 240, after which the counter is compared to the limit for the "raise threshold" interval in a step 250. A "no" condition returns the process to checking time ticks in the step 230. A "yes" condition initiates a test to determine if counter (2) TxUpRetryCount is greater than the limit. A "yes" condition raises the threshold by one block in a step 270. A "no" condition advances the process to a step 280 to reset the counters (1), (2) and after which the process returns to step 230 in checking timer ticks.

Summarizing the process increments the transmit up frame counter and the transmit down frame counter for every frame transmitted. The transmit up retry counter and the transmit down retry counter are incremented for every frame completed with a retry/underrun condition. At the end of the "raise threshold interval" if a certain percentage (e.g., 1% of the frames transmitted were retried), the threshold is raised by one block to not exceed the size of the frame. At the end of this interval, the relevant counters are reset. At the end of the "lower threshold interval" if no frames were retried, the threshold is lowered by one block to a minimum of one block. At the end of this lower threshold interval, relevant counters are reset. Using this process, the transmit threshold is raised or lowered during operation to minimize the number of underruns and maximize the performance. The process shown in FIGS. 4 and 5 determine and adjusts the threshold which is relayed to the processor 28 by way of the host descriptor on a frame-by-frame basis.

While the invention has been shown and described in conjunction with a preferred embodiment, various changes may be made in the spirit and scope of the system and method without departing from the spirit and scope of the invention, as defined in the appended claims, in which:

We claim:

1. In a local area network, a system for avoiding transmit underruns from a host system to a communications network using an adjustable threshold on a frame basis, wherein said threshold indicates the number of data blocks included in said frame comprising:
    a) a media access control (MAC) device coupled to the network;
    b) a data bus interconnecting the host system and the MAC device;
    c) means providing a block size of data to be transferred by frame from the host to the communication network via the data bus and the MAC device;
    d) counter means including an up counter responsive to a first host timer tick and a down counter responsive to a second host timer tick for defining an up or down threshold in each frame; and
    e) means for modifying the threshold in each frame to avoid transmit underruns.

2. The system of claim 1 further including means for generating a "retry" bit when a transmit underrun occurs.

3. The system of claim 1 wherein the media access control device includes a processor, storage device and medium independent interface.

4. The system of claim 1 wherein the number of blocks of data to be transferred from the host system to the MAC device is determined by a device driver to avoid a transmit underrun to the communication network.

5. The system of claim 1 further including means for counting time ticks to raise or lower the threshold to avoid an underrun.

6. The system of claim 1 further including means for establishing a time interval for raising or lowering the threshold where a lower threshold interval is longer than a raise threshold interval in terms of time ticks.

7. The system of claim 1 further including means for establishing timing intervals for raising or lowering the threshold.

8. The system of claim 7 wherein the lower threshold interval is longer than the raise threshold in terms of timer ticks.

9. The system of claim 1 further including means for determining whether to raise or lower the threshold interval according to a pre-selected timing interval.

10. In a local area network, a host system coupled to a communication network via a communication bus and a media access control (MAC) device, the host system including a device driver and timer; host descriptors; and host buffer; the MAC device including a processor; and transmit storage device, a method for avoiding transmit underruns in host data transmitted to the communication network using an adjustable threshold on a frame basis, wherein said threshold indicates the number of data blocks include in said frame, comprising the steps of:
    a) establishing counters in the device driver;
    b) counting transmit time ticks from the timer;
    c) maintaining transmit up and down frame counters from the timer for frames transmitted during a "raise threshold" or "lower threshold" interval, respectively; the time ticks for the "lower threshold" being longer than the time ticks for the "raise threshold"
    d) maintaining a transmit up and down frame retry counters from the timer for frames retried in the "raise threshold" and "lower threshold" intervals, respectively; and
    e) determining the optimum threshold for frame transmission without underruns based upon the counter status to raise or lower the transmit threshold in a frame to minimize the number of transmit underruns, the threshold being raised if a selected percentage of frames were retried during the "raise threshold" interval and being lowered if zero frames were retried during the "lower threshold" interval.

11. The method of claim 10 further comprising the step of:
    a) generating a control word to transmit data by frames from the storage device to the network.

12. The method of claim 10 further comprising the step of:
    a) generating an adjustable threshold in each frame to avoid an underrun condition in the network.

13. The method of claim 10 further comprising the step of:
    a) automatically generating and sending a retry signal to the device driver for re-adjusting the threshold in each frame transmitted to the storage device thereby to avoid an underrun condition.

14. The method of claim 10 further comprising the step of:
    a) generating a frame descriptor for blocks of data transferred from the host system to the storage device.

* * * * *